A. M. WELLINGTON.
APPLIANCE FOR HANDLING RAPID TRANSIT PASSENGER TRAFFIC.
No. 10,927. Reissued May 1, 1888.
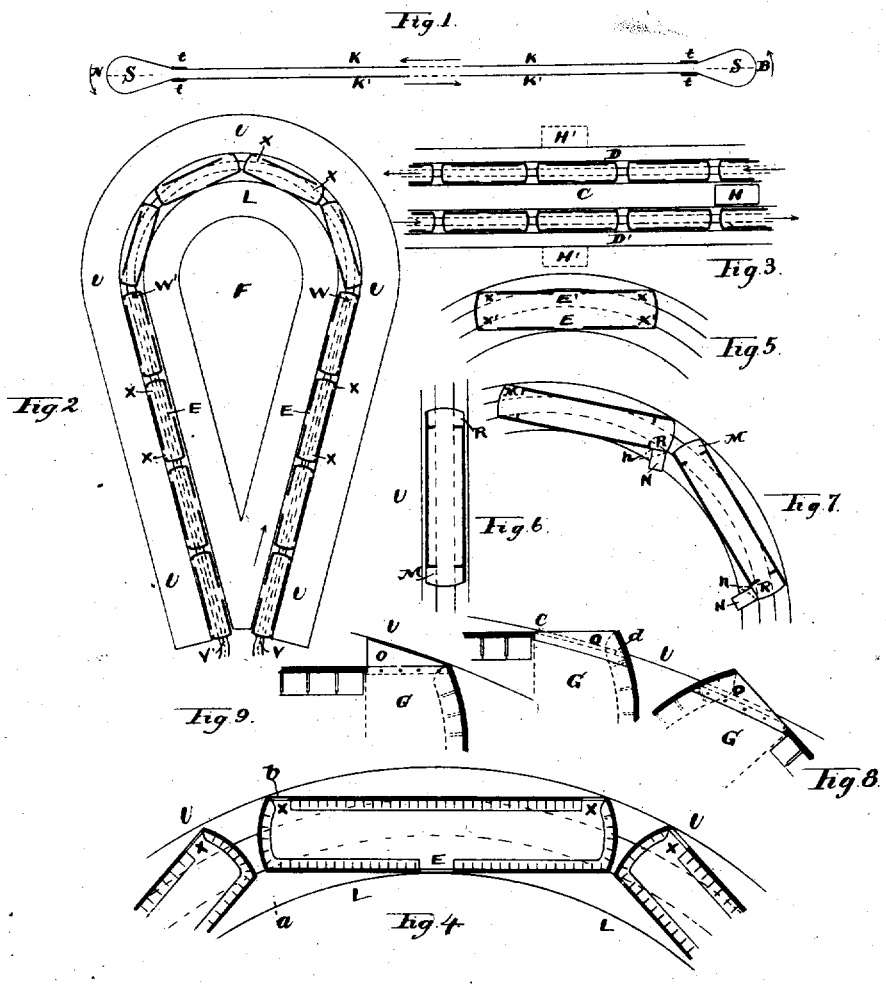
WITNESSES
C. S. Ametuty
Geo. W. King
Arthur M. Wellington INVENTOR
By Leggett & Leggett Attorneys
N. PETERS, Photo-Lithographer, Washington, D. C.

UNITED STATES PATENT OFFICE.

ARTHUR M. WELLINGTON, OF NEW YORK, N. Y.

APPLIANCE FOR HANDLING RAPID-TRANSIT PASSENGER TRAFFIC.

SPECIFICATION forming part of Reissued Letters Patent No. 10,927, dated May 1, 1888.

Original No. 371,816, dated October 18, 1887. Application for reissue filed February 16, 1888. Serial No. 264,274.

*To all whom it may concern:*

Be it known that I, ARTHUR M. WELLINGTON, of the city, county, and State of New York, have invented a certain new and useful Improvement in Appliances for Handling Rapid-Transit Passenger Traffic, whereof the following is a full and true description, reference being had to the drawings hereunto attached.

In the drawings, Figure 1 shows the general arrangement of tracks; Fig. 2, the arrangement of terminal stations; Fig. 3, the arrangement of intermediate or way stations; Fig. 4, the preferable arrangement of car-doors; Fig. 5, an alternate arrangement of car-doors; Figs. 6 and 7, another alternate arrangement; and Figs. 8 and 9, a detail of the corner of cars or car-platforms, like letters referring to like parts in each.

My improvement consists in a novel arrangement of the entrance and exit doors of cars and of the track and station-platforms, the combined effects of which are to overcome these four difficulties which have heretofore existed in operating rapid-transit roads of heavy traffic, and especially elevated roads of short length between terminal stations only, as on the New York and Brooklyn bridge—first, that passengers could not be transmitted over the entire length of track, because a certain distance, S, Fig. 1, at each end must be devoted to switching, thus compelling the station-platforms to be placed at *t t*; second, that the entrances and exits of passengers could not go on at the same time, because of their interference with each other; third, that the stations could not be on a curve, because the necessary clearance-space between stations left dangerous or impracticable gaps *a*, Fig. 4, between the car and station-platforms; fourth, that it was impossible to get trains of great length within a small terminal station. The effect of these four difficulties combined has been that trains were obliged to unload and load at platforms on a straight line only, that much time has been lost, and that trains have been cut down for lack of switching-room to one-fourth or one-fifth of what is possible by my system.

In the application of my system to rapid-transit lines having many way-stations the following further advantages are secured: Fifth, more than half the cost of way-station service for ticket-sellers, gate-keepers, and platform-guards is saved; sixth, direct communication with all platforms from either side of the street is afforded, saving each passenger on an average one needless crossing of the street; seventh, part of the power otherwise lost at each stop is saved, resulting in a saving of fuel, which I estimate at from ten to twenty per cent.; eighth, stopping and starting is quicker, as well as the entrance and exit of passengers, reducing in both ways time of transit; ninth, a larger number of cars can be hauled by the same engine, owing to the greater ease of starting.

The first element of my device is that the uptrack K and downtrack K′, which may be of any length and alignment, shall be connected together at their extremities by semicircular loops N B, so as to form a closed or endless track, around which trains continuously circulate while in service, thus bringing the same side of the car always toward the opposite track or inclosed space and the same cars always at the rear of the train, an incidental advantage of which is that it permits certain rear cars to be made smoking-cars without danger of annoyance to non-smokers.

The next element of my device is to separate completely incoming and outgoing passengers by permitting entrance to the cars from one side only and exit from the other side only by doors which are not opposite to the entrance-doors in the usual way, but as far removed from them longitudinally as possible. This is preferably accomplished by a car arranged as in Fig. 4, since it also secures another important end, to make the car equally convenient for landing at platforms on straight lines and on any curve, however sharp, provided these curves turn always in the same direction.

In Fig. 4, E is the entrance-door, placed in the middle of the car. By placing the loading-platform L at a distance just sufficient to clear E, which distance will vary with the sharpness of the curve and the length of the car, it is sufficiently evident that the door E will always be in close contact with the loading-platform, however great an interval, *a*, separates the ends of the car from it.

The exit-doors X X, I place on the opposite sides of the car at its extremities, for the double purpose of insuring that the exit-doors shall always be in contact with the unloading or discharging platform U, and of removing them as far as possible from the entrance-door E longitudinally.

Figs. 2, 3, and 4 make it evident that cars thus constructed are equally well suited for landing at straight or curved platforms, with one slight exception to be referred to, which is provided for in Figs. 8 and 9.

Fig. 3 represents a way-station on straight line, in which the central platform, C, is the loading-platform for both tracks, connected by suitable stairways and passages with the street, and D D′ are the discharging-platforms. In this way a single ticket-office, H, displaces the two ticket-offices H′, which have heretofore been customary. This not only dispenses with one ticket-seller and door-keeper at each station, but it dispenses with the necessity of one to three platform-guards to control the interfering currents of incoming and outgoing passengers, since it abolishes all tendency to interference. The platforms are connected transversely by passages immediately under the rails. The necessary horizontal space is preferably obtained by cutting off four to eight feet from the end of two contiguous trusses, both of which may still be carried on a single post by proper mechanical details. The necessary head-room is secured without raising the general level of the track by giving the track at the station an elevation two to five feet higher than the general level, and connecting it by quick-rising grades with the track on each side. This is highly advantageous in itself, since it saves the destruction of so much energy which would otherwise have to be destroyed by the brakes, and facilitates quick stopping and starting as well as the hauling of longer trains. The passages under the rails place each platform in direct communication with the sidewalks of both sides of the street, so that there is no longer necessity for half the passengers to cross the street unnecessarily merely to reach or to obtain exit from their proper platform.

The terminal station, Fig. 2, is placed at the very extremity of the line, and preferably arranged in horseshoe or rotunda like form with the loading-platforms L on the inside, thus leaving a conveniently-located central space, F, for commodious waiting-rooms, ticket-offices, and other like uses, while the more extensive unloading-platforms U permit of prompt discharge of passengers in various directions by as many exits as desired.

By this system the two processes of loading and unloading mutally assist instead of interfering with each other and go on simultaneously. Passengers entering at E will naturally go toward the end of the car, to be as near the exit as possible, and when their terminal station is reached will be gathered at X X, awaiting exit, leaving the middle of the car free for incoming passengers. From five to thirty seconds per stop is thus saved, and serious annoyance and even danger, when the cars are crowded, averted.

When the motive power used is a cable, the incoming cable V should preferably leave the track at a sheave, W, and pass thence, by any convenient path, under the central space, F, and across to a corresponding sheave, W′. It is sufficiently evident that this dispenses with all need for special switching appliances or motors under all conditions, for the head of the train is over the outgoing cable W′ before the rear of the train has dropped the incoming cable. In case short trains of four to six cars are run at certain hours the momentum of the incoming train is utilized to carry it around the horseshoe curve to the outgoing cable V′, so that it is in position to start out again at once. Disabled cars can likewise be switched out by the cable in case there is a downgrade toward the station, as there usually should be.

I do not limit myself to these precise arrangements in several respects. It may in certain cases be desirable to make the door E the exit and use the doors X for entrance, with a corresponding reversion in the loading and unloading platforms, although this will ordinarily be less desirable. Similarly, the car E X, Fig. 4, may be constructed either with or without the usual end platforms, provided exit from these platforms be permitted only from one side. It will be in general inexpedient to waste the seating-space for the platforms, but on short runs with crowded cars may be desirable. End doors for communicating from car to car may or may not be used. Similarly, it may in some cases be desirable to adapt the cars for stopping at stations curving in either direction, although, as respects the terminals, this can never be essential. In such cases, if it be considered that the seating-space can be spared, end doors or platforms, X X′, Fig. 5, with openings on each side of the car, may be constructed with duplicate middle doors likewise, E E′, provided only that at any one stop only one of the middle doors, E, and the diagonally-opposite pair of end doors or gates, X, be opened. On track curving, as in Fig. 5 the doors E X X only would be opened. On track curving in the opposite direction the doors E′ X′ X′ only would be opened. This retains all the advantages of the system, and on short runs with many curves may be expedient, since it enables the stations to be placed at the very corners of bends in the tracks, which, it is geometrically demonstrable, results in the shortest average walk for passengers to the station, but it wastes seating-space. Similarly, a car of the form M R, Fig. 6, may be used, whether with or without end platforms, especially as a temporary resource, until all the equipment is of more desirable form, the entrance-door M being in one corner of the car and the exit-door R in the diagonally-opposite corner. Cut the car E X, Fig. 4, in two by a middle partition through the door E, and we have the car M R, which retains the same principle, so far as the handling of passengers is concerned. In each case the entrance and exit doors may be said to be diagonally opposite; but in one respect the form M R is objectionable. At a station on a curve one of the doors, R, must stand away from the platform, making it necessary to use some special device for landing at N'. Any fixed or movable platform may be used for this purpose; but the landing is accomplished, preferably, by a combined platform-gate and landing-platform hinged to the car-platform at *h h*, counterweighted so as to be readily handled, and otherwise constructed in a manner which is made the subject of separate application. Finally, the necessity of reconstructing any of the cars or stations, except the terminal horseshoes, so as to utilize the full advantages of my system, may be evaded or postponed for a time by running end-platform cars of ordinary construction, from which exit on either side is permitted, in connection with a horseshoe terminal station where for the time being either an outside platform, U, or inside platform, L, or both, are used for exit or entrance indiscriminately, and with only a part of the way-stations provided with the platforms D D' C, as described. While I deem this under ordinary circumstances extremely injudicious, yet by the mere use of my peculiar form of terminal station the first and fourth advantages above enumerated are fully secured, which are in certain localities of extreme importance, and the necessary foundations are laid for applying my complete system at any time without expense for further changes or reconstruction. Neither is it essential that trains of the full length contemplated should be used for many years. In that case the left half only of the terminal U may be built, postponing the construction of the other half until it is needed.

It is desirable, but not essential, that all the cars operated by my system should be of the same length. The length may be varied considerably by reducing the width as the length increases, or vice versa, and the cars still be used at the same platforms.

As respects the end doors, X X, an inconvenience results on curves, from the fact that the side of the platform or car stands at an angle to the face of the platforms, leaving a vacant interval, *b*, Fig. 4. This I overcome by the method shown in Fig. 8. The frame or floor of the car or platform is chamfered off on the line *c d*, so as to clear the sharpest curves on the line and permit the point *c* to approach closely to the station-platform. The car or platform floor is then extended by a thin triangular extension, O, of any material, preferably of boiler-iron faced with rubber, so as to extend over the platform, which is made lower than the straight platforms by the thickness of this plate. The car is then adapted to stop at platforms on any curve and leave no gap to endanger passengers, while on straight lines the use of the exit-door is not affected. Such a plate would have an element of danger if sweeping along the edge of a platform on which passengers might be standing; but when X is used as the exit-door, as it preferably is, no passengers are standing on the platform when a train arrives. The same may be accomplished in substantially the same way, but in one which can rarely be expedient, by attaching the plate O to extend beyond the face of a rectangular platform, as shown in Fig. 9, making the curved platforms, instead of the straight, of a height to be flush with this plate, and the straight platforms, instead of the curved, somewhat lower than the plate, to permit it to ride over them.

In the application of my system of operating rapid-transit roads it is very desirable to be able to use very sharp terminal curves N B, Fig. 1, which is accomplished, preferably, by a peculiar form of flanged wheel running in a grooved and greased rail, which is made the subject of separate application. By this system it is feasible to run around curves as sharp as fifty to sixty feet radius at six to ten miles per hour with but little more resistance than on a straight line.

I do not claim, broadly, the connection of tracks by a loop, nor the use of separate exit and entrance platforms at stations, since I am aware that they have been in a measure anticipated.

I claim as new—

1. In rapid-transit passenger-cars, the central door, E, in combination with diagonally-opposite end doors or platforms, X, substantially as shown and described, and for the purpose described.

2. In rapid-transit passenger-cars, the middle doors, E E', in combination with end doors or platforms, X X', substantially as shown and described, and used for the purpose and in the manner described.

3. A rapid-transit passenger-car having diagonally-opposite exits and entrances, each at any one stop on one side only, in combination with a terminal receiving-platform, L, of horseshoe form, on one side of the track and a corresponding discharging-platform, U, on the other side, substantially as shown and described, and for the purpose described.

4. A rapid-transit passenger-car having diagonally-opposite exits and entrances, each at any one stop on one side only, in combination with a single central platform, C, and side platforms, D D', the one being for loading only and the other for unloading only, substantially as shown and described, and for the purpose described.

5. In rapid-transit passenger service, the combination, with passenger-cars having diagonally-opposite exits and entrances, each at any one stop on one side only, of the main tracks K K' and end loops, N B, substantially as shown and described, and for the purpose described.

6. In rapid-transit passenger service, the combination, with passenger-cars having diagonally-opposite exits and entrances, each at any one stop on one side only, of the main tracks K K′, end loops, N B, and terminal platforms U L, substantially as shown and described, and for the purpose described.

7. In rapid-transit passenger service, the combination, with passenger-cars having diagonally-opposite exits and entrances, each at any one stop on one side only, of the main tracks K K′, end loops, N B, and way-platforms C D D′, substantially as shown and described, and for the purpose described.

8. The projecting triangular platform-plate O, in combination with station-platforms of slightly-varying height on straight lines and on curves, to permit the plate to ride over the one while running flush with the other, substantially as shown and described.

9. In rapid-transit passenger service, a terminal station, approximately of horseshoe form, having the tracks within it on which trains stop to unload passengers, and provided with landing-platforms on either side, at which the trains may stop, with front and rear of the train approximately opposite each other, and with the middle car of the train at or near the middle of the horseshoe, so as to accommodate a longer train than the station itself, substantially as set forth.

10. In rapid-transit passenger service, the combination of main tracks K K′, loops or closed circuits N B, and semicircular or horseshoe station U L, having its landings for the middle car of trains at or near to the middle of the horseshoe, substantially as shown and described, and for the purpose described.

11. In rapid-transit passenger service, the combination of the main tracks K K′, loops or closed circuits N B, terminal station U L, and way-station D C, substantially as shown and described, and for the purpose described.

12. In rapid-transit passenger service, the combination of the main tracks K K′, closed circuits or loops N B, and way-station D C, substantially as shown and described, and for the purpose described.

ARTHUR M. WELLINGTON.

Witnesses:
GEO. H. FROST,
M. N. BAKER.